US011449630B2

(12) United States Patent
Talwar (10) Patent No.: US 11,449,630 B2
(45) Date of Patent: Sep. 20, 2022

(54) EMBEDDED THIRD-PARTY APPLICATION PROGRAMMING INTERFACE TO PREVENT TRANSMISSION OF SENSITIVE DATA (71) Applicant: EQUIFAX INC., Atlanta, GA (US)

(72) Inventor: Hrishi Talwar, Atlanta, GA (US)

(73) Assignee: EQUIFAX INC., Atlanta, GA (US)

(*) Notice: Subject to any disclaimer, the term of this patent is extended or adjusted under 35 U.S.C. 154(b) by 43 days.

(21) Appl. No.: 16/772,568

(22) PCT Filed: Dec. 13, 2018

(86) PCT No.: PCT/US2018/065376
§ 371 (c)(1),
(2) Date: Jun. 12, 2020

(87) PCT Pub. No.: WO2019/118682
PCT Pub. Date: Jun. 20, 2019

(65) Prior Publication Data
US 2020/0394331 A1 Dec. 17, 2020

Related U.S. Application Data (60) Provisional application No. 62/598,777, filed on Dec. 14, 2017.

(51) Int. Cl.
G06F 21/00 (2013.01)
G06F 21/62 (2013.01)
H04L 9/40 (2022.01)

(52) U.S. Cl.
CPC ...... *G06F 21/6245* (2013.01); *H04L 63/0884* (2013.01); *H04L 63/18* (2013.01); *G06F 2221/2115* (2013.01)

(58) Field of Classification Search
CPC ......... G06F 21/6245; G06F 2221/2115; G06F 21/31; H04L 63/0884; H04L 63/18; H04L 63/0823; H04L 63/08
See application file for complete search history.

(56) References Cited

U.S. PATENT DOCUMENTS 5,960,411 A 9/1999 Hartman et al.
6,944,669 B1 9/2005 Saccocio
(Continued)

FOREIGN PATENT DOCUMENTS

CA 2413340 C 10/2009
KR 20130103697 A 9/2013
(Continued)

OTHER PUBLICATIONS

Vielhauer, Claus. "Fundamentals in User Authentication: Techniques for Binding Identities to Information." Biometric User Authentication for it Security: From Fundamentals to Handwriting (2006): 77-115. (Year: 2006).*
(Continued)

*Primary Examiner* — Kendall Dolly
(74) *Attorney, Agent, or Firm* — Kilpatrick Townsend & Stockton LLP (57) ABSTRACT Aspects and examples are disclosed for improving security of authentication elements for validating a user of a user device. In one example, a processor of a user device establishes a first communication channel with a host computing system, and a user interface capable of transmitting information to the host computing system via the first channel. An API on the user device establishes a second communication channel with an identification-and-authentication system. The API receives sensitive information entered in the user interface and prevents transmission of the sensitive information to the host computing systems via the first channel. The API also transmits to the identification-and-authentication system, via the second channel, a signal including the sensitive information. The identification-and-authentication system may use the signal to send to the host computing system an additional signal verifying that the user of the user device is authenticated.

16 Claims, 4 Drawing Sheets

(56) References Cited

U.S. PATENT DOCUMENTS

| | | |
|---|---|---|
| 7,080,049 B2 | 7/2006 | Truitt et al. |
| 8,045,956 B2 | 10/2011 | Sun et al. |
| 8,121,941 B2 | 2/2012 | Matthews et al. |
| RE44,513 E | 10/2013 | Nobrega et al. |
| 8,577,803 B2 | 11/2013 | Chatterjee et al. |
| 8,996,423 B2 | 3/2015 | Johnson et al. |
| 9,112,857 B2 | 8/2015 | Coppinger |
| 9,799,027 B2 | 10/2017 | Pasa et al. |
| 10,115,102 B2 | 10/2018 | Burrell et al. |
| 10,863,359 B2 | 12/2020 | Talwar |
| 2003/0101136 A1 | 5/2003 | Wheeler et al. |
| 2004/0006535 A1 | 1/2004 | Forbes, Jr. et al. |
| 2004/0122684 A1 | 6/2004 | Kaikuranta |
| 2004/0168054 A1 | 8/2004 | Halasz et al. |
| 2004/0177252 A1 | 9/2004 | Vallee et al. |
| 2004/0230534 A1 | 11/2004 | McGough |
| 2004/0259626 A1 | 12/2004 | Akram et al. |
| 2005/0272465 A1 | 12/2005 | Ahmavaara et al. |
| 2006/0041755 A1* | 2/2006 | Pemmaraju ........... H04L 63/083 713/182 |
| 2006/0233332 A1 | 10/2006 | Toms |
| 2006/0235761 A1 | 10/2006 | Johnson et al. |
| 2006/0235796 A1 | 10/2006 | Johnson et al. |
| 2007/0178883 A1 | 8/2007 | Nandagopal |
| 2007/0244831 A1 | 10/2007 | Kuo |
| 2007/0255646 A1 | 11/2007 | Morris et al. |
| 2007/0255662 A1 | 11/2007 | Tumminaro |
| 2007/0265928 A1 | 11/2007 | Fuchs et al. |
| 2008/0044031 A1 | 2/2008 | Mishra |
| 2009/0036111 A1 | 2/2009 | Danford et al. |
| 2009/0276368 A1 | 11/2009 | Martin et al. |
| 2009/0300097 A1 | 12/2009 | Meyer |
| 2010/0095359 A1 | 4/2010 | Gordon |
| 2010/0125737 A1 | 5/2010 | Kang |
| 2010/0218241 A1 | 8/2010 | Faryna |
| 2011/0238580 A1 | 9/2011 | Coppinger |
| 2011/0247045 A1 | 10/2011 | Rajagopal et al. |
| 2011/0270751 A1 | 11/2011 | Csinger et al. |
| 2011/0295750 A1 | 12/2011 | Rammal |
| 2011/0296513 A1 | 12/2011 | Kasad |
| 2011/0320347 A1 | 12/2011 | Tumminaro et al. |
| 2012/0030110 A1 | 2/2012 | Prakash et al. |
| 2012/0150750 A1 | 6/2012 | Law et al. |
| 2012/0203605 A1 | 8/2012 | Morgan et al. |
| 2012/0209749 A1 | 8/2012 | Hammad et al. |
| 2012/0240204 A1* | 9/2012 | Bhatnagar ............... G06F 21/30 726/5 |
| 2012/0300932 A1 | 11/2012 | Cambridge et al. |
| 2012/0331532 A1 | 12/2012 | Walters et al. |
| 2013/0024371 A1 | 1/2013 | Hariramani et al. |
| 2013/0226792 A1 | 8/2013 | Kushevsky et al. |
| 2013/0262311 A1 | 10/2013 | Buhrmann et al. |
| 2013/0309999 A1 | 11/2013 | Modiano |
| 2014/0109175 A1 | 4/2014 | Barton et al. |
| 2014/0122226 A1 | 5/2014 | Downing et al. |
| 2014/0136346 A1 | 5/2014 | Teso |
| 2014/0258136 A1 | 9/2014 | Ellis |
| 2014/0279523 A1 | 9/2014 | Lynam et al. |
| 2014/0282897 A1 | 9/2014 | Stuntebeck |
| 2015/0026049 A1 | 1/2015 | Theurer et al. |
| 2015/0046339 A1 | 2/2015 | Wong et al. |
| 2015/0088751 A1 | 3/2015 | Grigg et al. |
| 2015/0106270 A1 | 4/2015 | Burrell et al. |
| 2015/0149359 A1 | 5/2015 | Forte |
| 2015/0350177 A1 | 12/2015 | Sharp et al. |
| 2016/0171555 A1 | 6/2016 | Buerger et al. |
| 2016/0277380 A1 | 9/2016 | Wagner et al. |
| 2016/0300231 A1 | 10/2016 | Shavell et al. |
| 2016/0381038 A1 | 12/2016 | Disraeli |
| 2017/0178142 A1 | 6/2017 | Dutt et al. |
| 2017/0221055 A1 | 8/2017 | Carlsson et al. |
| 2018/0204234 A1 | 7/2018 | Hermoni et al. |
| 2020/0145385 A1* | 5/2020 | Chauhan ............ H04L 63/0884 |
| 2021/0044976 A1* | 2/2021 | Avetisov ............ H04W 12/069 |

FOREIGN PATENT DOCUMENTS

| | | |
|---|---|---|
| WO | 2006113834 A2 | 10/2006 |
| WO | 2010088757 A1 | 8/2010 |
| WO | 2013166507 A1 | 11/2013 |
| WO | 2013181151 A2 | 12/2013 |
| WO | 2015057538 | 4/2015 |

OTHER PUBLICATIONS

U.S. Appl. No. 14/512,493, "Final Office Action", dated Apr. 30, 2018, 11 pages.

U.S. Appl. No. 14/512,493, "Non-Final Office Action", dated Jul. 14, 2017, 17 pages.

U.S. Appl. No. 14/512,493, "Notice of Allowance", dated Jun. 29, 2018, 18 pages.

AU2014334713, "First Examination Report", dated May 1, 2019, 4 pages.

AU2014334713, "Second Examination Report", dated Dec. 24, 2019, 4 pages.

AU2014334713, "Third Examination Report", dated Apr. 30, 2020, 4 pages.

EP14853685.7, "Extended European Search Report", dated Mar. 10, 2017, 7 pages.

EP14853685.7, "Office Action", dated Sep. 13, 2018, 7 pages.

EP14853685.7, "Summons to Attend Oral Proceedings", dated Apr. 6, 2020, 23 pages.

EP14853685.7, "Summons to Attend Oral Proceedings", dated Aug. 13, 2019, 10 pages.

EP14853685.7, "Summons to Attend Oral Proceedings", dated Nov. 15, 2019, 18 pages.

IN201637008409, "First Examination Report", dated Nov. 28, 2019, 6 pages.

PCT/US2014/060217, "International Search Report and Written opinion", dated Jan. 12, 2015, 11 pages.

PCT/US2018/027518, "International Preliminary Report on Patentability", dated Oct. 24, 2019, 12 pages.

PCT/US2018/027518, "International Search Report and Written Opinion", dated Jul. 26, 2018, 17 pages.

PCT/US2018/040055, "International Preliminary Report on Patentability", dated Jan. 9, 2020, 8 pages.

PCT/US2018/040055, "International Search Report and Written Opinion", dated Nov. 14, 2018, 12 pages.

PCT/US2018/065376, "International Search Report and Written Opinion", dated Mar. 25, 2019, 14 pages.

PCT/US2018/065376, "International Preliminary Report on Patentability", dated Jun. 25, 2020, 10 pages.

U.S. Appl. No. 16/146,256, "Final Office Action", dated Mar. 19, 2021, 19 pages.

European Patent Application No. 18822628.6, "Extended European Search Report", dated Feb. 23, 2021, 9 pages.

European Patent Application No. 21159404.9, "Extended European Search Report", dated Mar. 31, 2021, 10 pages.

U.S. Appl. No. 16/146,256, "Non-Final Office Action", dated Oct. 27, 2020, 21 pages.

U.S. Appl. No. 16/160,639, "Final Office Action", dated Feb. 8, 2021, 13 pages.

U.S. Appl. No. 16/160,639, "Non-Final Office Action", dated Oct. 30, 2020, 13 pages.

U.S. Appl. No. 16/328,595, "Notice of Allowance", dated Aug. 19, 2020, 18 pages.

U.S. Appl. No. 16/328,595, "Notice of Allowance", dated Jun. 25, 2020, 26 pages.

Australian Patent Application No. 2018291152, "First Examination Report", dated Dec. 21, 2020, 4 pages.

Canadian Patent Application No. 2,924,009, "Office Action", dated Dec. 29, 2020, 3 pages.

Canadian Patent Application No. 3,067,821, "Notice of Allowance", dated Jan. 6, 2021, 1 pages.

European Patent Application No. 18784109.3, "Extended European Search Report", dated Nov. 2, 2020, 9 pages.

(56) References Cited

OTHER PUBLICATIONS

Kumar, "An Overview of Hypertext Transfer Protocol Service Security on Business Domain", 2012 International Conference on Management and Education Innovation IPEDR, vol. 37, 2012, pp. 285-289.
Molina, et al., "Database Systems The Complete Book", Pearson Prentice Hall Inc., 2009, pp. 1-1204.
International Application No. PCT/US2014/060217, "International Preliminary Report on Patentability", dated Apr. 28, 2016, 8 pages.
U.S. Appl. No. 16/146,256, "Non-Final Office Action", dated Dec. 17, 2021, 24 pages.
U.S. Appl. No. 16/146,256, "Notice of Allowance", dated Apr. 6, 2022, 7 pages.
U.S. Appl. No. 16/160,639, "Final Office Action", dated Apr. 8, 2022, 18 pages.
U.S. Appl. No. 16/160,639, "Non-Final Office Action", dated Oct. 28, 2021, 17 pages.
U.S. Appl. No. 16/500,788, "Non-Final Office Action", dated Oct. 4, 2021, 14 pages.
U.S. Appl. No. 16/500,788, "Notice of Allowance", dated Mar. 10, 2022, 7 pages.
AU2018253294, "First Examination Report", dated Dec. 23, 2021, 4 pages.
AU2018291152, "Notice of Acceptance", dated Oct. 27, 2021, 3 pages.
AU2018291152, "Second Examination Report", dated Apr. 26, 2021, 3 pages.
AU2018291152, "Third Examination Report", dated Sep. 21, 2021, 2 pages.
AU2020202925, "First Examination Report", dated Jun. 23, 2021, 6 pages.
AU2020202925, "Second Examination Report", dated Dec. 24, 2021, 4 pages.
CA2,924,009, "Office Action", dated Oct. 13, 2021, 2 pages.
EP18822628.6, "Notice of Decision to Grant", dated Mar. 24, 2022, 2 pages.
U.S. Appl. No. 16/146,256, "Notice of Allowance", dated May 19, 2022, 11 pages.
U.S. Appl. No. 16/160,639, "Advisory Action", dated Jun. 14, 2022, 5 pages.
U.S. Appl. No. 16/500,788, "Notice of Allowance", dated Jun. 2, 2022, 7 pages.
Australian Patent Application No. 2020202925, "Third Examination Report", dated May 31, 2022, 5 pages.
European Patent Application No. 18784109.3, "Notice of Decision to Grant", dated Jun. 17, 2022, 2 pages.

\* cited by examiner

EMBEDDED THIRD-PARTY APPLICATION PROGRAMMING INTERFACE TO PREVENT TRANSMISSION OF SENSITIVE DATA

CROSS-REFERENCE TO RELATED APPLICATIONS

This disclosure claims priority to U.S. Provisional Application Ser. No. 62/598,777 filed Dec. 14, 2017 and titled "Embedded Third-Party Application Programming Interface to Intercept Sensitive Data," the contents of which are hereby incorporated by reference.

TECHNICAL FIELD

This disclosure relates generally to information security for preventing unauthorized use of program features or sensitive data transmission, and more particularly to providing an embedded third-party application programming interface to intercept sensitive data.

BACKGROUND

Interactive computing environments, such as mobile applications or other interactive software platforms, allow users to perform various computer-implemented functions through graphical interfaces. To access certain software features provided by a host computing system within an interactive computing environment, an end user may provide sensitive data to validate his or her identity. The sensitive information may be entered into a graphical user interface provided by the host computing system.

In conventional techniques for validation, the host computing system may store or transmit the sensitive information for authentication purposes, such as verifying the sensitive information or relaying the sensitive information to an additional computing system for verification. Such storage or transmissions may introduce additional points at which the sensitive information could be compromised, for example, by malicious interference with the transmissions. Prior solutions for using sensitive data to selectively grant or deny access to features of an interactive computing environment may therefore fail to prevent transmission and storage of sensitive information to a host computing system, when engaging in a transaction with the host computing system.

SUMMARY

Aspects and examples are disclosed for using an embedded third-party application programming interface to prevent transmission of sensitive data. In one example, one or more processing devices, such as (but not limited to) processors on a personal computing device of a user, implements a set of instructions to establish a first communication channel with a host computing system that provides an interactive computing environment. The processing device generates a user interface capable of transmitting information to the host computing system, via the first communication channel, as part of an electronic transaction. The processing device also executes an application programming interface ("API") to establish a second communication channel with an identification-and-authentication system. The second communication channel is out-of-band with respect to the first communication channel. The API receives sensitive information that is input to a particular portion of the user interface, and prevents transmission of the sensitive information to the host computing system via the first communication channel. The API also transmits, via the second communication channel, a first signal to the identification-and-authentication system, the first signal including the sensitive information for authenticating the user and transaction data for identifying the electronic transaction. The identification-and-authentication system may be configured to use the first signal to send a second signal to the host computing system, the second signal verifying that the user of the processing device is authenticated.

This illustrative example is mentioned not to limit or define the invention, but to aid understanding thereof. Other aspects, advantages, and features of the present invention will become apparent after review of the entire description and figures, including the following sections: Brief Description of the Figures, Detailed Description, and Claims.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

As described herein, certain aspects provide improvements to interactive computing environments by solving data-security problems that are specific to an online platform, such as an interactive computing environment, that is hosted by a host computing system and accessed by user devices. For example, a host computing system may restrict access to a function for advancing an online transaction or other operation within an interactive computing environment. To obtain access to this function, a user device must often validate his or her identity. Validation often includes submitting one or more authentication elements, such as personal data or other sensitive information, to the host computing system. In existing systems, sensitive information, such as authentication elements, is transmitted to or stored by the host computing system. The host computing system may validate the authentication elements by transmitting the authentication elements to an additional computing system for validation. The host computing system may lack security features for preventing unauthorized access to the authentication elements. Additionally or alternatively, existing techniques may involve the user device transmitting an entire authentication element to the host computing system. If the user device transmits the credential without appropriate wireless security, such as a public wireless network, the authentication element could be intercepted by a third-party device and used by the third-party device to gain illicit or unauthorized access to the function within the host computing system.

Certain aspects and examples are disclosed for improving security of sensitive information by preventing transmission of the sensitive information to a host computing system. An embedded third-party application programming interface ("API") may prevent transmission by intercepting sensitive data on a network. The third-party API can be embedded in an interface (e.g., a graphical user interface ("GUI")) provided by a host computing system when providing access to the interactive computing environment (e.g., via a mobile website or other mobile application) during a session between the host computing system and a user device. The embedded third-party API can intercept sensitive data (e.g., personally identifiable data such as a social security number) provided by the user device and provide the sensitive data to an identification-and-authentication system. In some aspects, the identification-and-authentication system can provide the host computing system with third-party validation of the sensitive data, and can prevent the host computing system from receiving, storing, or transmitting the sensitive data.

Some examples of these aspects can overcome one or more of the issues identified above by allowing a mobile device to use sensitive information (i.e., an authentication element) within an interactive computing environment without the sensitive information having to be transmitted to or stored by the host computing system. In one example, a secure identification-and-authentication system can validate a set of authentication elements and provide the validation to a host computing system via system-to-system communications. Enhanced security provided by these system-to-system communications can reduce or eliminate the risk of third-party devices intercepting an authentication element from an additional transmission from the user device to the host computing system.

In additional or alternative aspects, the identification-and-authentication system can identify and authenticate a user associated with the user device and prepopulate other fields in the interface. Prepopulating interface fields can reduce the need for a user to manually enter one or more authentication elements into the user device, which can likewise reduce opportunities for theft of the authentication element via keyboard-logging software or other technologies used to clandestinely steal sensitive information.

In some aspects, the identification-and-authentication system can include an identification-and-authentication server for communicatively coupling with a host computing system via a communication channel. The host computing system can be conducting an electronic transaction with a mobile device via an interface provided on a second communication channel. The identification-and-authentication system can provide the host computing system with an API to embed in the interface. The identification-and-authentication system can communicate with the mobile device via the API on a third communication channel. The identification-and-authentication server can communicate with a telecommunication provider system, which allows the mobile device to communicate with the interface via data networks. In some aspects, the identification-and-authentication system can perform third-party validation of information provided via the API by comparing the received information with information obtained by the telecommunication providers.

The identification-and-authentication system can transmit the third-party API to the host computing system for being embedded into a GUI provided by the host computing system to a user device. The identification-and-authentication system can receive the sensitive data from the user device via the embedded third-party API. The identification-and-authentication system can include one or more transceivers for communicatively coupling the identification-and-authentication system to the user device or the host computing system. A first transceiver can communicate with the host computing system via a first communication channel (e.g., a wired connection, a wireless connection, or a combination thereof). A second transceiver can communicate with the user device via a second communication channel formed using one or more protocols specified by the API. In some aspects, the identification-and-authentication system can include additional transceivers for communication with other systems via additional communication channels. In additional or alternative aspects, the first communication channel can be out-of-band with respect to the second communication channel. By using out-of-band communication channels, the identification-and-authentication system can communicate with the host computing system, user device, and other systems substantially simultaneously during an electronic transaction while preventing the host computing system, user device, or other systems from directly communicating.

One or more features described herein can improve the operation of identification-and-authentication systems and other validation systems used in electronic communications. For example, if an identification-and-authentication system receives sensitive data directly via an API accessible to a user device, a host computing system can be prevented from receiving, storing, or transmitting this sensitive data. In some aspects, the host computing system can be prevented from receiving, storing, or transmitting this sensitive data even though the host computing system provides, to the user device, an interface for entering the sensitive data. Preventing the host computing system from accessing the sensitive data can enhance protection of the sensitive data, reduce security costs for the host computing system, or both.

In some aspects, the identification-and-authentication system can perform third-party validation of the sensitive information for a host computing system. The third-party validation can include generating data to be transmitted to the host computing system or the user device. For example, the identification-and-authentication system can receive signals from the mobile device, via the API, including sensitive information and a unique identifier of the electronic transaction occurring between the mobile device and the host computing system. The identification-and-authentication system can validate the sensitive information and generate data to be transmitted to the host computing system indicting that the mobile device associated with the electronic transaction has provided valid information.

For example, the identification-and-authentication system can provide a communication point-of-interface between various independent host computing systems and independent telecommunication providers. For example, the identification-and-authentication system can service validation requests from various host computing systems for authentication elements or other identification information required for accessing various functions within the host computing systems. The identification-and-authentication system can service these requests using data network identifiers. The data network identifiers can identify mobile user devices (e.g., a smart phone, tablet, e-reader, or laptop computer) involved in online transactions with interactive computing environments provided by host computing systems. Non-limiting examples of a data network identifier include an internet protocol ("IP") address assigned to a mobile user device, a telephone number of a smart phone, etc. In some aspects, a mobile user device may identify a user of the mobile user device via biometrics, data entry, or any other suitable process for identifying a user of a mobile user device. An interactive computing environment provided by a host computing system can be accessed using a web browser, a dedicated mobile application, or other client applications executed on a mobile user device.

In some aspects, using the identification-and-authentication system as an interface between the host computing system and a telecommunication provider facilitates third-party authentication support in real time (e.g., between commencement and completion of an online transaction). For example, during a given transaction, the identification-and-authentication system can transmit a request to a telecommunication provider to provide a credential, such as an account credential, that is associated with a user of the mobile user device. The identification-and-authentication system can receive, from the telecommunication provider, a response identifying the credential. The identification-and-authentication system can use the credential to retrieve authentication elements or other identification data associated with the user. The identification-and-authentication system can analyze the authentication elements to determine a subset of the authentication elements that are valid for the online transaction or otherwise usable for providing the mobile user device with access to a function that advances the online transaction with the host computing system. The identification-and-authentication system can provide an indication of the validated set of authentication elements to the host computing system, the mobile user device, or both for completing (or otherwise advancing) the online transaction. In some aspects, the set of authentication elements can include multiple elements, and the identification-and-authentication system can provide one or more of the elements, including masked or otherwise secured elements, to the mobile user device or the host computing system, such as to prepopulate a field in a user interface.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Example of an Operating Environment

Figure 1:
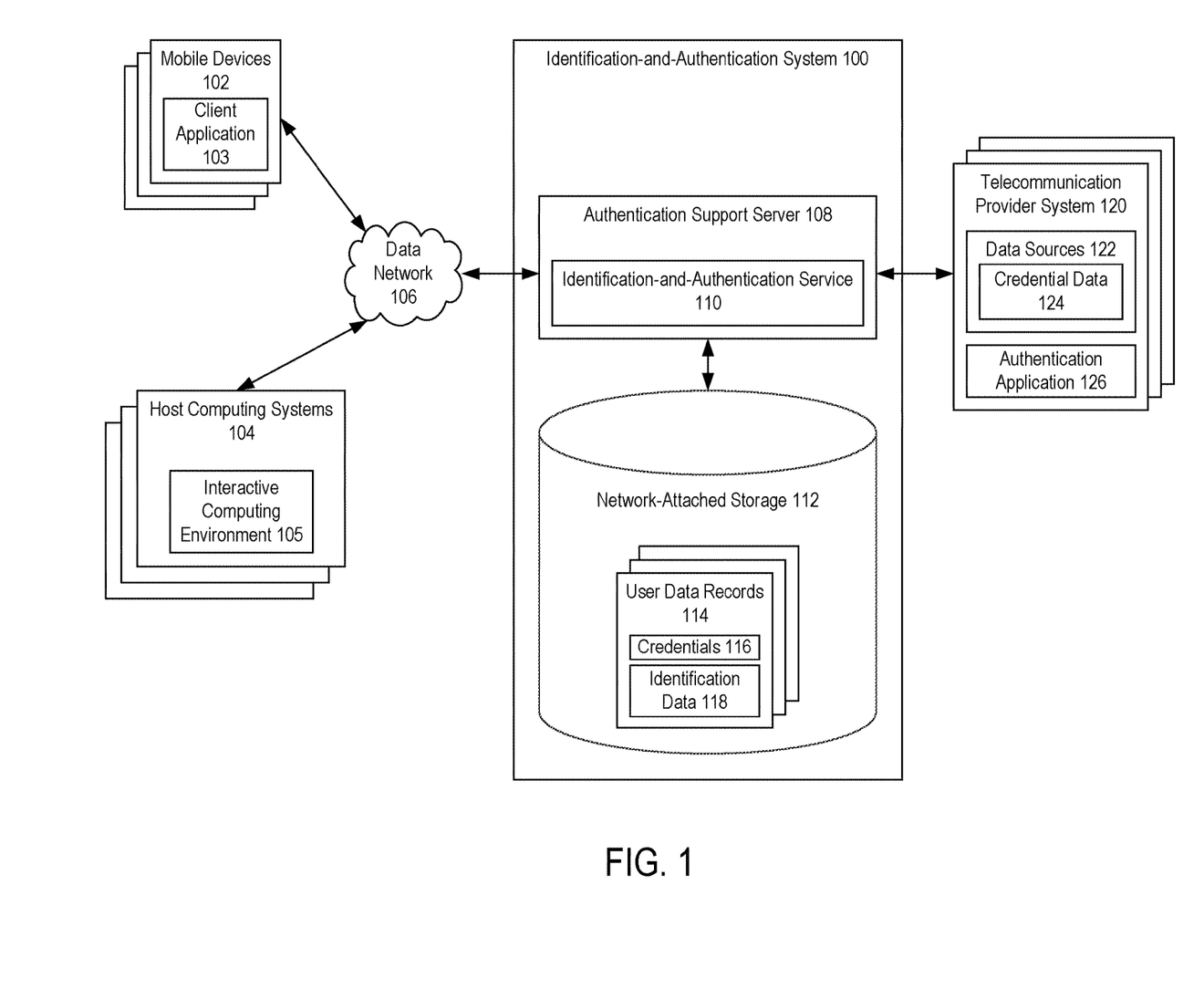
FIG. 1 is a block diagram illustrating an example of an identification-and-authentication system communicatively coupled to mobile devices, host computing systems, and telecommunication provider systems according to one aspect of the present disclosure.

Referring now to the drawings, FIG. 1 depicts an example of an identification-and-authentication system 100 for providing third-party validation of information in an electronic transactions with host computing systems 104. FIG. 1 depicts examples of hardware components of an identification-and-authentication system 100 according to some aspects. The identification-and-authentication system 100 is a specialized computing system that may be used for performing large amounts of third-party validation, identity verification, and other operations using a large number of computer processing cycles.

The numbers of devices depicted in FIG. 1 are provided for illustrative purposes. Different numbers of devices may be used. For example, while certain devices or systems (e.g., a authentication support server 108, a network-attached storage unit 112, etc.) are shown as single devices in FIG. 1, multiple devices may instead be used to implement these devices or systems (e.g., a cloud or grid-based authentication support server system, a group of network-attached storage devices, etc.).

The identification-and-authentication system 100 can communicate with one or more host computing systems 104. The host computing systems 104 may interact with one or more user devices, such as the mobile devices 102, via one or more data networks 106 to facilitate electronic transactions between users of the mobile devices 102 and one or more interactive computing environment 105 that is hosted by, provided by, or otherwise associated with the host computing systems 104. (Although FIG. 1 depicts mobile devices 102, any suitable user device, such as a desktop computer, may be used.) Each host computing system 104 may include one or more devices (e.g., computing devices or groups of computing devices), such as individual servers or groups of servers operating in a distributed manner.

A host computing system 104 can include any computing device or group of computing devices operated by a seller, lender, or other provider of products or services. The host computing system 104 can include one or more server devices. The one or more server devices can include or can otherwise access one or more non-transitory computer-readable media. The host computing system 104 can also execute an interactive computing environment 105, such as an online service that is accessible via a web browser or dedicated software application. The interactive computing environment 105 can include executable instructions stored in one or more non-transitory computer-readable media. The host computing system 104 can further include one or more processing devices that are capable of executing the interactive computing environment 105 to perform, in real time during an electronic transaction between a mobile device 102 and the host computing system 104, operations described herein.

In some aspects, the interactive computing environment 105 can provide an interface (e.g., a website, web server, or other server) to engage in mobile commerce with a user of a mobile device 102. The interactive computing environment 105 may transmit data to and receive data from the client application 103 to perform one or more functions within the interactive computing environment 105, such as performing and completing a transaction between a user device and the host computing system 104. The interface can include an API associated with the identification-and-authentication system 100. In some aspects, the API can be generated based on a set of code provided to the interactive computing environment 105 by the identification-and-authentication system 100.

The identification-and-authentication system 100 can be communicatively coupled directly to the mobile device 102 via a communication channel formed using one or more protocols provided by the API. Information provided by the mobile device 102 can be transmitted, using the API, directly from the mobile device 102 to the identification-and-authentication system 100. The API can intercept sensitive information being provided by the mobile device 102 in response to requests by the host computing system 104 as part of an electronic transaction and prevent the sensitive data from being transmitted to the host computing system 104. In some aspects, the sensitive data can include personally identifiable data or financial data regarding payment sources. In some aspects, the identification-and-authentication system 100 can perform third-party verification of the user associated with the mobile device 102 based on the sensitive data without the host computing system 104 receiving, storing, or transmitting sensitive data.

Each communication within the identification-and-authentication system 100 (e.g., between mobile devices 102 and the authentication support server 108, between host computing systems 104 and the authentication support server 108, etc.) may occur over one or more data networks 106. A data network 106 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the data network 106.

A data network 106 may include network computers, sensors, databases, or other devices that may transmit or otherwise provide data to the authentication support server 108. For example, a data network 106 may include local area network devices, such as routers, hubs, switches, or other computer networking devices. The data networks 106 can be incorporated entirely within (or can include) an intranet, an extranet, or a combination thereof. In one example, communications between two or more systems or devices can be achieved by a secure communications protocol, such as secure Hypertext Transfer Protocol ("HTTP") communications that use secure sockets layer ("SSL") or transport layer security ("TLS"). In addition, data or transactional details communicated among the various computing devices may be encrypted.

The identification-and-authentication system 100 can include one or more authentication support servers 108. The authentication support server 108 may be a specialized computer or other machine that processes the data received within the identification-and-authentication system 100. The authentication support server 108 may include one or more other systems. For example, the authentication support server 108 may include a database system for accessing the network-attached storage unit 112, a communications grid, or both. A communications grid may be a grid-based computing system for processing large amounts of data.

In some aspects, the authentication support server 108 can communicate with the mobile device 102 via a communication channel formed by the API embedded in the interface provided by the interactive computing environment 105. In additional or alternative aspects, the authentication support server 108 can allow the identification-and-authentication service 110 to be an interface between various host computing systems 104 and various telecommunication provider systems 120. This architecture can facilitate the real-time provision of information from the identification-and-authentication service 110 to host computing systems 104. This provision of information facilitates completion of electronic transactions, third-party validation, or both in real time (e.g., during an electronic transaction between the host computing system 104 and a mobile device 102). The identification-and-authentication service 110 can communicate with the various telecommunication provider systems 120 in a manner that is out-of-band with respect to the host computing systems 104, the mobile devices 102, or both. For example, the communications between the identification-and-authentication service 110 and a telecommunication provider system 120 can be performed via a separate communication channel, separate session, or both, as compared to the communication channel or session established between the identification-and-authentication service 110 and the host computing system 104.

In some aspects, the authentication support server 108 can include one or more processing devices that execute program code, such as an identification-and-authentication service 110. The identification-and-authentication service 110 can execute one or more processes for facilitating third-party validation and other aspects of electronic transactions between mobile devices 102 and host computing systems 104 via interactive computing environments 105. The identification-and-authentication service 110 can include executable instructions stored in one or more non-transitory computer-readable media. In some aspects, the identification-and-authentication service 110 can include one or more modules, such as a web server module, a web services module, or an enterprise services module, which individually or in combination facilitate electronic transactions. For example, a web server module can be executed by a suitable processing device to provide one or more web pages or other interfaces to one of the mobile devices 102, one of the host computing systems 104, or one of the telecommunication provider systems 120. The web pages or other interfaces can include content provided by the web services module. The web services module can generate this content by executing one or more algorithms using information retrieved from one or more of the user data records 114. The enterprise services module can be executed to retrieve the information from one or more of the user data records 114.

The identification-and-authentication system 100 may also include one or more network-attached storage units 112. The network-attached storage unit 112 may store a variety of different types of data organized in a variety of different ways and from a variety of different sources. For example, the network-attached storage unit 112 may include storage other than primary storage located within authentication support server 108 that is directly accessible by processors located therein. In some aspects, the network-attached storage unit 112 may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The network-attached storage unit 112 can include memory devices for storing user data records 114 that include credentials 116 and identification data 118. The user data records 114 can be received by a authentication support server 108 via a data network 106, generated by the authentication support server 108 based on communications with mobile devices 102, generated by the authentication support server 108 based on communications with host computing systems 104, or some combination thereof. The user data records 114 can be stored in, for example, a database, or other suitable data source. Suitable data sources can include, for example, secure and credentialed databases or other data structures managed by or otherwise accessible by the identification-and-authentication service 110.

The user data records 114 can include identification data 118. Identification data 118 can include any information that can be used to uniquely identify an individual or other entity. In some aspects, identification data 118 can include information that can be used on its own to identify an individual or entity. Non-limiting examples of such identification data 118 include one or more of a legal name, a company name, a social security number, a credit card number, a date of birth, an e-mail address, etc. In other aspects, identification data 118 can include information that can be used in combination with other information to identify an individual or entity. Non-limiting examples of such identification data 118 include a street address or other geographical location, employment data, etc. In some aspects, information from the user data records 114 can be processed to generate derived data about a user (e.g., risk assessments, credit scores, etc.).

Each credential 116 can include information that can be used to uniquely identify a credit file or other source of identification data regarding an individual or other entity. In some aspects, a credential 116 can include information that can be used on its own to identify the credit file or other data source including identification data of an individual or entity. Non-limiting examples of such a credential 116 include one or more of an account number, a legal name, an address, a social security number, a credit card number, etc.

In some aspects, the identification data 118 can include credit data. Credit data can include data associated with a user's credit file. A credit file can be a historical report that is prepared or provided by a credit bureau. For example, a credit file can include one or more of identification data, a credit card account, a loan, a bankruptcy, a late payment, an inquiry, a credit score, a credit card number, etc. In some aspects, a credit file can include additional data from data sources other than credit reporting data to augment the credit reporting data. Non-limiting examples of such additional data include information obtained from utility providers, information obtained from wireless service providers, information obtained from credit card issuers, real estate data, etc. The user data records 114 can also include account data. Account data can include data associated with a user's credit account. For example, account data can include a user's name, address, an account number, authentication information (e.g., a personal identification number, a password, etc.), a username, etc. The user data records 114 can further include lender data. Lender data can include data associated with lenders of credit or money, or other financial product or service providers. For example, lender data can include data associated with a bank, trust, credit union, insurance company, brokerage firm, etc. The user data records 114 can also include any other relevant data, such as income and employment data, asset data, education data, etc. In some aspects, data from multiple user data records 114 can be linked to or otherwise associated with a given user using a referential keying system. The user data records 114 can be updated periodically or continuously.

In some aspects, the identification-and-authentication service 110 can include an identification validation module that executes one or more processes for validating identification data (e.g., a payment source). In some aspects, the identification validation module can configure the identification-and-authentication service 110 to obtain transaction data about an electronic transaction via an API embedded in an interface (e.g., a GUI) executed by the interactive computing environment 105, where the interface is provided to the mobile device 102 as part of the electronic transaction. The transaction data can be provided directly from the client application 103 to the identification-and-authentication service 110, via the API, without providing the transaction data to the host computing system 104. The identification validation module can use the transaction data to verify that the mobile device 102 meets certain requirements for completing the electronic transaction. For example, the authentication support server 108 can receive transaction data indicating that an electronic transaction requires a user associated with the mobile device 102 to have a credit card with a credit limit above a threshold amount. The authentication support server 108 can receive credit card information from the mobile device 102, via the API, and verify that the credit card meets the credit limit. The authentication support server 108 can transmit a signal to the host computing system 104 indicating the mobile device 102 has submitted valid payment information.

A mobile device 102 can include any computing device or other communication device operated by a consumer, a buyer, or other user. The mobile device 102 can include one or more client applications 103. A client application 103 can include executable instructions stored in one or more non-transitory computer-readable media. The mobile device 102 can also include one or more processing devices that are capable of executing the client application 103 to perform operations described herein. In some aspects, the client application 103 can provide an interface (e.g., a web browser or a mobile application) through which a user can engage in mobile commerce with a host computing system 104. For instance, the user or other entity accessing the mobile device 102 can use the client application 103 to engage in an electronic transaction with a host computing system 104 via an interactive computing environment 105 (e.g., a host computing system 104 accessible via a mobile application or web-based application accessible via mobile device, a host computing system 104 accessible via an online system such as a website, etc.). The third-party API can be embedded in the interface provided by the interactive computing environment 105 such that the client application 103 can provide data directly to the API.

A telecommunication provider system 120 can include any computing device or group of computing devices operated by a telecommunication or wireless network provider. The telecommunication provider system 120 can include one or more server devices. The one or more server devices can include or can otherwise access one or more non-transitory computer-readable media. An authentication application 126 or one or more data sources 122 can be stored in one or more non-transitory computer-readable media. The data sources 122 can have any of the structures or configurations described with respect to the user data records 114 of the identification-and-authentication system 100. The telecommunication provider system 120 can also include one or more processing devices that are capable of executing the authentication application 126 to perform operations described herein. In some aspects, the authentication application 126 can provide an interface through which the identification-and-authentication system 100 can acquire credential data 124 from the telecommunication provider system 120. Credential data 124 can include data associated with a telecommunication account (e.g., a user's telecommunication account). For example, credential data 124 can include a legal name, a social security number, a credit card number, an account number, an address, a mobile phone number, a mobile account number, a proxy to a mobile account number, etc. The identification-and-authentication system 100 can compare the received credential data 124 with one or more credentials 116 of the user data records 114 to obtain identification data 118 about a particular individual or entity. The identification data 118 can be used to validate information provided to the identification-and-authentication system 100, from the mobile device 102, via the API.

In some aspects, the identification-and-authentication system 100 can implement one or more procedures to secure communications between the identification-and-authentication system 100 and a mobile device 102, host computing system 104, or a telecommunication provider system 120. Non-limiting examples of features provided to protect data and transmissions between the identification-and-authentication system 100 and the mobile device 102, host computing system 104, or the telecommunication provider system 120 include secure web pages, encryption, firewall protection, network behavior analysis, intrusion detection, etc. In some aspects, transmissions with mobile devices 102, host computing systems 104, or telecommunication provider systems 120 can be encrypted using public key cryptography algorithms using a minimum key size of 128 bits. In additional or alternative aspects, website pages can be delivered through HTTPS or other secure server communications protocols. In additional or alternative aspects, electronic communications can be transmitted using Secure Sockets Layer ("SSL") technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

The identification-and-authentication system 100 can communicate with one or more mobile devices 102, host computing systems 104, and telecommunication provider systems 120 by applying authentication and authorization rules. The authentication and authorization rules can be used to authenticate and authorize the mobile device 102, host computing system 104, or telecommunication provider system 120 to receive information from the identification-and-authentication system 100.

Example of Third-Party Validation Using an Embedded API

Figure 2:
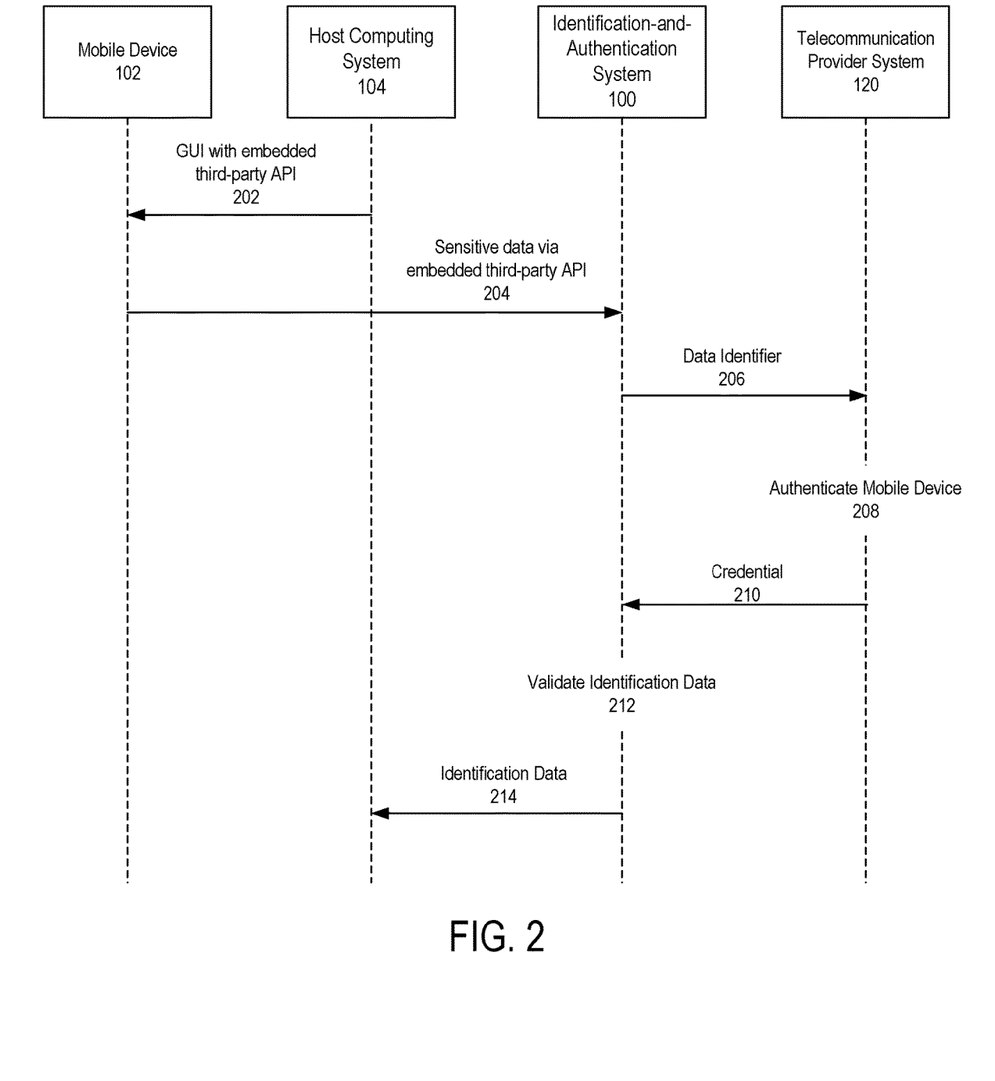
FIG. 2 is a sequence diagram depicting an example of interactions for accessing functions of an interactive computing environment provided by a host computing system, the interactions including validation by an identification-and-authentication system via an embedded application programming interface according to one aspect of the present disclosure.

FIG. 2 is a sequence diagram depicting interactions among a mobile device 102, a host computing system 104, an identification-and-authentication system 100, and a telecommunication provider system 120 during an electronic transaction between the mobile device 102 and the host computing system 104. In this example, the host computing system 104 transmits a communication 202 to the mobile device 102. The communication 202 can include a GUI provided by the interactive computing environment 105, which is executed on the host computing system 104. The GUI may include an embedded third-party API that can include instructions for intercepting sensitive data provided by the mobile device 102 and directing the sensitive data to the identification-and-authentication system 100. In some aspects, the interactive computing environment 105 can embed the API in the GUI by including a set of code implementing the API. The set of code can be provided by the identification-and-authentication system 100 in the instructions for creating the GUI. The GUI, including the API, may be accessible by a client application 103, which is executed on the mobile device 102. The GUI can be used by the mobile device 102 to access (or request access to) one or more functions of the interactive computing environment 105 provided by the host computing system 104.

The communication 202 can also include a request for sensitive data associated with a user of the mobile device 102. The GUI can provide, for example, one or more input fields requesting personally identifiable data such as a home address, a driver's license, or credit card information needed for accessing the functions of the interactive computing environment 105. In some cases, the GUI can provide fields requesting data for completion of an electronic transaction between the mobile device 102 and host computing system 104. In some aspects, the API can be activated by clicking, in the graphical user interface provided by the interactive computing environment 105, an option to use the authentication or identification services provided by the identification-and-authentication system 100. In additional or alternative aspects, the API can be embedded in the GUI to capture any information appear the same as the other requests in the graphical user interface.

The mobile device 102 can transmit a communication 204 directly to the identification-and-authentication system 100 using the API. In this example, the communication 204 includes sensitive data such as a data network identifier that can include any information usable for uniquely identifying a computing device (e.g., a mobile device) on a data network. In some aspects, a data network identifier can include information that can be used on its own to identify a computing device (e.g., an IP address). In other aspects, a data network identifier can include information that can be used in combination with other information to identify a computing device.

In this example, the identification-and-authentication system 100 transmits a communication 206 to the telecommunication provider system 120. The communication 206 includes a data identifier based on the sensitive data received from the mobile device 102. The telecommunication provider system 120 performs one or more operations 208 for authenticating the mobile device 102. In additional or alternative aspects, the identification-and-authentication system 100 may validate the sensitive information internally and avoid transmitting any data based on the sensitive data to other systems.

If the telecommunication provider system 120 successfully authenticates the mobile device 102, the telecommunication provider system 120 transmits a communication 210 to the identification-and-authentication system 100. In some aspects, the communication 210 includes credential data 124 for a user of the mobile device 102, as depicted in FIG. 2.

The identification-and-authentication system 100 performs one or more operations 212 for validating identification data 118 associated with the mobile device 102. In some aspects, the identification data 118 is retrieved from one or more user data records 114. The identification-and-authentication system 100 can analyze the identification data 118 to determine a subset of the identification data 118 that is valid identification data for the electronic transaction. Data describing the accessed or requested functions, such as transaction data indicating information about an electronic transaction, can be included in communication 204. For example, information about an electronic transaction can include requirements for successful completion of the electronic transaction. The requirements can include a valid payment method with sufficient funds, a valid address for delivery of a product, or verification that the user meets criteria (e.g., is a U.S. citizen). The data describing the accessed or requested functions can also include a unique function identifier that can be provided to the host computing system 104 to indicate the function from among several functions being provided by the host computing system 104. In additional or alternative aspects, the data describing the accessed functions can be received by the identification-and-authentication system 100 via a separate communication. For example, the identification-and authentication system 100 can transmit a communication to the host computing system 104 requesting transaction data after receiving communication 204.

In some aspects, the identification-and-authentication system 100 transmits a communication 214 to the host computing system 104, as depicted in FIG. 2. In some aspects, the communication 214 can include validated identification data that is retrieved from one or more user data records 114. In additional or alternative aspects, the identification data can lack sensitive data. For example, the identification data can include an identifier of the accessed function and an indicator that the mobile device 102 has provided valid data.

Figure 3:
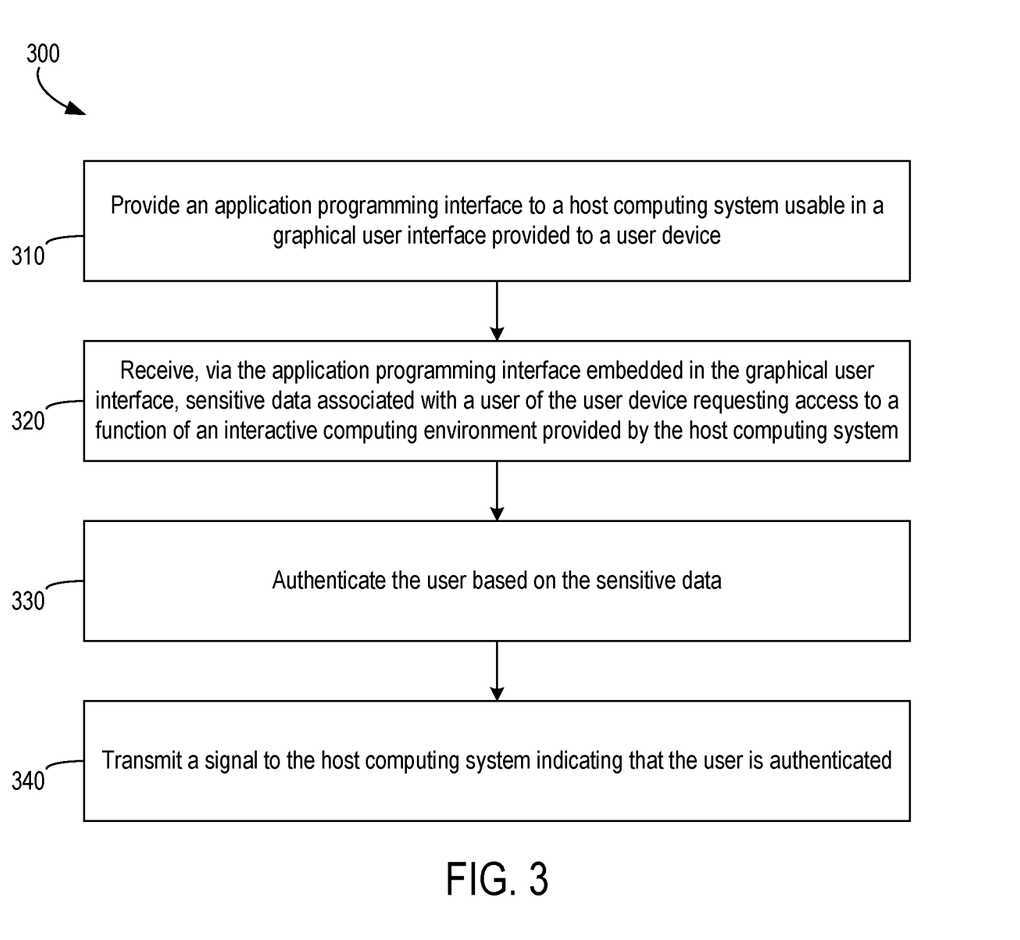
FIG. 3 is a flow chart depicting an example of a process for an embedded application programming interface to prevent transmission of sensitive data for accessing functions of an interactive computing environment according to one aspect of the present disclosure.

FIG. 3 is a flow chart illustrating an example of a process 300 for using an embedded API to prevent sensitive information from being transmitted between mobile devices 102 and host computing systems 104. For illustrative purposes, the process 300 is described with reference to implementations described above with respect to FIGS. 1 and 2. Other implementations, however, are possible. In some aspects, the steps in FIG. 3 may be implemented in program code that is executed by one or more computing devices such as the authentication support server 108 depicted in FIG. 1. In some aspects of the present disclosure, one or more operations shown in FIG. 3 may be omitted or performed in a different order. Similarly, additional operations not shown in FIG. 3 may be performed.

The process 300 involves providing an API to a host computing system, as depicted at block 310. The API can be usable in a graphical user interface provide to a user device, such as the mobile device 102, by the host computing system 104 for accessing (or requesting access to) one or more functions of an interactive computing environment 105 provided by the host computing system 104.

The process 300 also involves the identification-and-authentication service 110 receiving, via the API, sensitive data associated with a user of the mobile device 102, as depicted in block 320. The identification-and-authentication system 100 can execute the identification-and-authentication service 110 and thereby perform one or more operations for receiving the sensitive data. For example, the identification-and-authentication service 110 can open a server port or transmit a query to the interface executed by the interactive computing environment 105 and implementing the API. In some aspects, the API can "push" (i.e., redirect data without specifically receiving a request for the data) the sensitive data to the identification-and-authentication system 100.

The process 300 also involves the identification-and-authentication service 110 authenticating the user based on the sensitive data, as depicted at block 330. In some aspects, authenticating the user based on the sensitive data can include verifying an identity of the user based on comparing provided sensitive data with known sensitive data associated with the user. In additional or alternative aspects, authenticating the user can include storing the sensitive data such that the host computing system 104 is prevented from receiving, storing, or transmitting the sensitive data. The authentication support server 108 can store the sensitive data until it is requested by the host computing system 104. In additional or alternative aspects, authentication can include verifying that the user meets certain criteria (e.g., is a U.S. citizen) based on the sensitive data (e.g., a social security number, driver's license number, etc.). In additional or alternative aspects, authentication can include validating the identity of the user by comparing different pieces of personally identifiable data to verify the data belongs to a single identity. For example, the identification-and-authentication system 100 can include or be communicatively coupled to databases that include associations between previously verified personally identifiable data. The identification-and-authentication system 100 can use the databases to compare the received personally identifiable data with the previously verified personally identifiable data.

The process 300 also involves the identification-and-authentication service 110 transmitting a signal to the host computing system 104 indicating that the user is authenticated, as depicted at block 340. The signal may indicate that the user is authenticated for accessing one or more functions of the interactive computing environment 105 provided by the host computing system 104. In some aspects, the signal can be transmitted via a communication channel that is independent from the communication channel formed by the API. In additional or alternative aspects, the signal can be independent of the sensitive data such that the host computing system 104 is unable to determine the sensitive data from the signal. The signal can indicate that the user meets certain criteria, as described above, such as the user being a U.S. citizen. In some aspects, the signal can include an identifier associated with an electronic transaction between the user device and the host computing system 104.

In some aspects, the signal transmitted at block 304 can be a control signal that includes one or more authentication elements (e.g., the sensitive data). The control signal can cause the host computing system 104 to present, within the interactive computing environment 105, one or more interface elements that, when operated using a mobile device 102 or other user device, trigger or otherwise control one or more functions within the interactive computing environment 105. The control signal can cause a host computing system 104 to provide a mobile device 102 with access to a function within the interactive computing environment, thereby allowing the mobile device to control or advance one or more operating states of the interactive computing environment.

In some aspects, authenticating the user based on the sensitive data can include obtaining credential data associated with the mobile device 102 during the electronic transaction via communications with a telecommunication provider. The identification-and-authentication service 110 can execute the identification-and-authentication service 110 and thereby perform one or more operations for obtaining credential data. For example, the identification-and-authentication service 110 can configure a network interface device to transmit data associated with the sensitive data to a telecommunication provider system 120. The identification-and-authentication service 110 can establish and transmit the data to the telecommunication provider system 120 over a secure data connection or other communication channel, which is out-of-band with respect to a communication channel used by the identification-and-authentication service 110 with respect to the API or the host computing system 104. The telecommunication provider system 120 can communicate with one or more access points (e.g., base stations, microcells, etc.) used by the telecommunication provider system 120 to provide telecommunication service to the mobile device 102.

In some aspects, the telecommunication provider system 120 can use the sensitive data to identify associated credential data from one or more data sources 122. For instance, the telecommunication provider system 120 can receive data including an IP address for the mobile device 102. The telecommunication provider system 120 can determine associated credential data including a social security number. The telecommunication provider system 120 can transmit the credential data to the identification-and-authentication system 100. The telecommunication provider system 120 can also transmit other information to the identification-and-authentication system 100. The other information can include an account status (active, suspended, blacklisted, etc.), a mobile phone number, Subscriber Identity Module ("SIM") card information, etc.

In some aspects, the identification-and-authentication service 110 can configure a network interface device to transmit a suitable electronic communication (e.g., an Extensive Markup Language ("XML") document, a web page, an e-mail, etc.) to a host computing system 104 that executes the interactive computing environment 105. In some aspects, the identification-and-authentication service 110 can configure a network interface device to transmit a suitable electronic communication (e.g., an Extensive Markup Language ("XML") document, a web page, an e-mail, etc.) to mobile device 102 for use by a client application 103.

Computing System Example for Third-Party Validation

Figure 4:
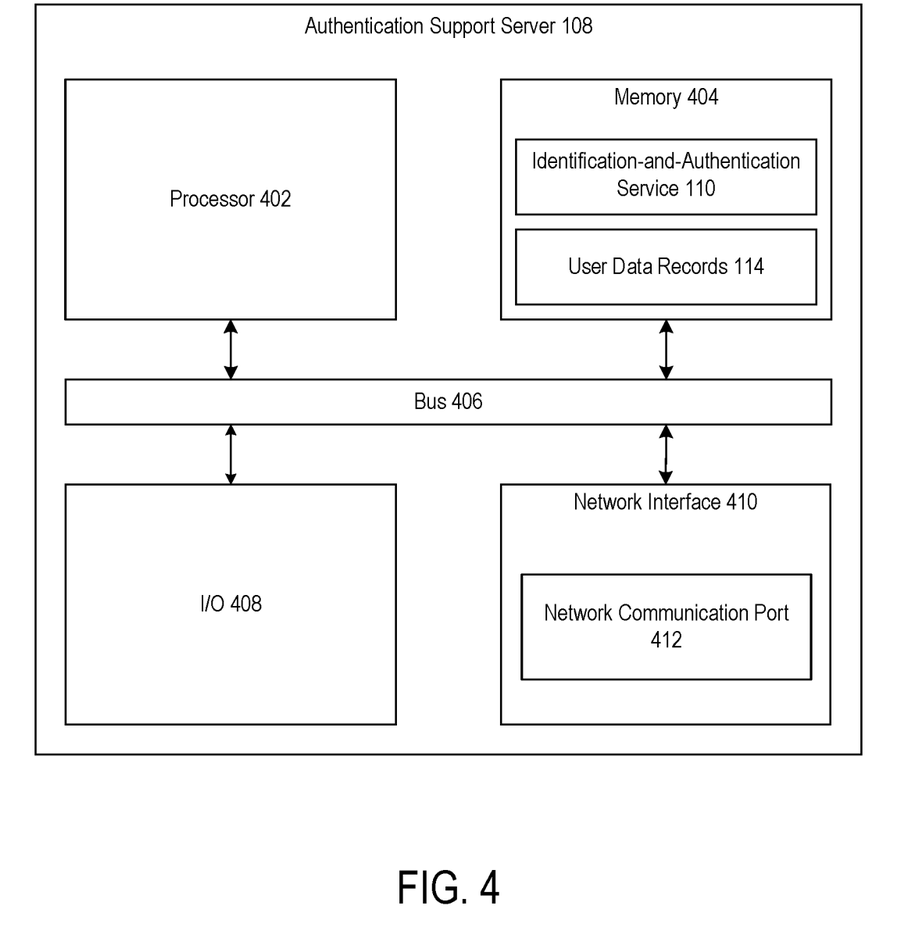
FIG. 4 is a block diagram of an identification-and-authentication system for intercepting sensitive data interactions for accessing functions of an interactive computing environment, using an embedded application programming interface according to one aspect of the present disclosure.

Any suitable computing system or group of computing systems can be used to perform the third-party validation, identity verification, and other operations described herein. For example, FIG. 4 is a block diagram depicting an example of a authentication support server 108. The example of the authentication support server 108 can include various devices for communicating with other devices depicted in FIG. 1. The authentication support server 108 can include various devices for performing one or more third-party validations, identity verification, and other operations described above with respect to FIGS. 1-3.

The authentication support server 108 can include a processor 402 that is communicatively coupled to a memory 404. The processor 402 executes computer-executable program code stored in the memory 404, accesses information stored in the memory 404, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 402 include a microprocessor, an application-specific integrated circuit, a field-programmable gate array, or any other suitable processing device. The processor 402 can include any number of processing devices. The processor 402 can include or communicate with a memory 404. The memory 404 stores program code that, when executed by the processor 402, causes the processor to perform the operations described in this disclosure.

The memory 404 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C #, Visual Basic, Java, Python, Perl, JavaScript, ActionScript, etc.

The authentication support server 108 may also include a number of external or internal devices such as input or output devices. For example, the authentication support server 108 is shown with an input/output interface 408 that can receive input from input devices or provide output to output devices. A bus 406 can also be included in the authentication support server 108. The bus 406 can communicatively couple one or more components of the authentication support server 108.

The authentication support server 108 can execute program code that includes the identification-and-authentication service 110. The program code for the identification-and-authentication service 110 may be resident in any suitable computer-readable medium and may be executed on any suitable processing device. For example, as depicted in FIG. 4, the program code for the identification-and-authentication service 110 can reside in the memory 404 at the authentication support server 108. Executing the identification-and-authentication service 110 can configure the processor 402 to perform the operations described herein with respect to FIGS. 1-3. In some aspects, the user data records 114 can also be stored in the memory 404.

In some aspects, the authentication support server 108 can include a network interface device 410. A network interface device 410 can include any device or group of devices suitable for establishing a wired or wireless data connection to one or more data networks 106. Non-limiting examples of the network interface device 410 include an Ethernet network adapter, a modem, etc. A network interface device 410 can include one or more network communications ports 412, where an address or other identifier of the communication port is used for communications with various client devices (e.g., a mobile device 102, a host computing system 104, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," and "determining" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A device comprising:
    a processing device; and
    a non-transitory computer-readable medium storing an application comprising a set of instructions that, when executed by the processing device, configure the processing device to:
        establish a first communication channel for communicatively coupling the device to a host computing system; and
        generate a user interface usable by a user associated with the device for transmitting, to the host computing system and via the first communication channel, information required for accessing one or more functions of an interactive computing environment provided by the host computing system,
    the set of instructions including an embedded application programming interface ("API") within the user interface, wherein the API is executed by the processing device to:
        establish a second communication channel for communicatively coupling the device, via the API, to an identification-and-authentication system, the second communication channel being out-of-band with respect to the first communication channel;
        receive sensitive data input to a portion of the user interface and prevent, via the API, the sensitive data that is received in the portion of the user interface from being transmitted to the host computing system via the first communication channel; and
        transmit a first signal to the identification-and-authentication system via the second communication channel, the first signal having the sensitive data and being usable by the identification-and-authentication system to transmit a second signal to the host computing system verifying that the user is authenticated for accessing the one or more functions of the interactive computing environment, wherein the second signal includes validation data generated by the identification-and-authentication system, the validation data usable by the host computing system to provide access to the one or more functions and avoid receiving the sensitive data.

2. The device of claim 1, wherein the API is embedded in the user interface by the host computing system based on a third signal transmitted to the host computing system from the identification-and-authentication system.

3. The device of claim 1, wherein the second communication channel is established based on one or more protocols specified by the API.

4. The device of claim 1, wherein the one or more functions are usable for completing an electronic transaction between the host computing system and the device.

5. The device of claim 4, wherein the first signal includes transaction data for identifying the electronic transaction.

6. An identification-and-authentication system comprising:
    a processing device;
    a network communications port communicatively coupleable to a user device via a first communication channel and communicatively coupleable to a host computing system via a second communication channel that is out-of-band with respect to the first communication channel, the first communication channel being established via an application programming interface ("API") embedded in a user interface, the user interface configured for being provided from the host computing system to the user device for accessing one or more functions of an interactive computing environment provided by the host computing system; and
    a non-transitory computer-readable medium included in or communicatively coupled to the processing device, the non-transitory computer-readable medium storing a data structure for storing user data records and executable instructions that, when executed by the processing device, configure the processing device to cause the identification-and-authentication system to:
        receive, by the network communications port via the first communication channel, a first signal from the user device via the API, the first signal including sensitive data that is associated with a user of the user device and that is used to request access to the one or more functions of the interactive computing environment, the sensitive data received by the API in a portion of the user interface as part of information being provided to complete an electronic transaction;
        authenticate, by the processing device, the user based on the sensitive data; and
        transmit, by the network communications port via the second communication channel, a second signal to the host computing system, the second signal including validation data representing that the user is authenticated for accessing the one or more functions of the interactive computing environment via the user interface in which the API is embedded, wherein the identification-and-authentication system generates the validation data based on the sensitive data, and the validation data is by the host computing system to provide access to the one or more functions and avoid receiving the sensitive data.

7. The identification-and-authentication system of claim 6, wherein the non-transitory computer-readable medium includes further instructions that are executable by the processing device to cause the identification-and-authentication system to transmit, by the network communications port, a third signal to the host computing system, the third signal usable by the host computing system to embed the API in the user interface provided by the host computing system to the user device.

8. The identification-and-authentication system of claim 6, wherein the non-transitory computer-readable medium includes further instructions that are executable by the processing device to cause the identification-and-authentication system to store the sensitive data in the non-transitory computer-readable medium.

9. The identification-and-authentication system of claim 6, wherein the network communications port is communicatively coupleable to a telecommunication provider via a third communication channel that is out-of-band with respect to the first communication channel and the second communication channel, wherein the host computing system is remote from the identification-and-authentication system and from the telecommunication provider, the non-transitory computer-readable medium further comprising instructions executable by the processing device for causing the identification-and-authentication system to:

obtain credential data associated with the user device by communicating with the telecommunication provider;

retrieve identification data from a credit file associated with the credential data, the credit file stored on the non-transitory computer-readable medium and the identification data being usable for accessing the one or more functions; and transmit, via the second communication channel and prior to the electronic transaction being completed, an identification signal including the identification data to the host computing system.

10. The identification-and-authentication system of claim 6, wherein the first communication channel is established based on one or more protocols specified by the API.

11. The identification-and-authentication system of claim 6, wherein the one or more functions are usable for completing the electronic transaction between the host computing system and the user device.

12. The identification-and-authentication system of claim 11, wherein the first signal includes transaction data for identifying the electronic transaction.

13. A method for authenticating a user of a user device, the method including operations executed by one or more processing devices included in an identification-and-authentication system, the operations comprising:

establishing a first communication channel to the user device and a second communication channel to a host computing system, wherein:

the first communication channel is established via an application programming interface ("API") embedded in a user interface, the user interface configured for being provided from the host computing system to the user device for accessing one or more functions of an interactive computing environment provided by the host computing system, and the second communication channel is out-of-band with respect to the first communication channel;

receiving, via the first communication channel, a first signal from the user device via the API, the first signal including sensitive data that is associated with the user of the user device and that is used to request access to the one or more functions of the interactive computing environment, the sensitive data received by the API as part of information being provided to complete an electronic transaction;

authenticating the user based on the sensitive data; and transmitting, via the second communication channel, a second signal to the host computing system, the second signal including validation data representing that the user is authenticated for accessing the one or more functions of the interactive computing environment, wherein the validation data is generated based on the sensitive data and the validation data is usable by the host computing system to provide access to the one or more functions and avoid receiving the sensitive data.

14. The method of claim 13, the operations further comprising transmitting a third signal to the host computing system, the third signal usable by the host computing system to embed the API in the user interface provided by the host computing system to the user device.

15. The method of claim 13, wherein the one or more functions are usable for completing the electronic transaction between the host computing system and the user device.

16. The method of claim 15, wherein the first signal includes transaction data for identifying the electronic transaction.

\* \* \* \* \*